United States Patent [19]
Tamura et al.

[11] Patent Number: 6,000,629
[45] Date of Patent: *Dec. 14, 1999

[54] SUCK BACK VALVE WITH LINEAR ACTUATOR AND ENCODER ARRANGEMENT

[75] Inventors: Kazuya Tamura, Soka; Hirosuke Yamada; Nobuhiro Fujiwara, both of Ibaraki-ken, all of Japan

[73] Assignee: SMC Kabushiki Kaisha, Tokyo, Japan

[ * ] Notice: This patent is subject to a terminal disclaimer.

[21] Appl. No.: 09/032,835

[22] Filed: Mar. 2, 1998

[30] Foreign Application Priority Data

Apr. 10, 1997 [JP] Japan ................................. 9-092603

[51] Int. Cl.⁶ ........................................ B05B 15/00

[52] U.S. Cl. ........................ 239/119; 239/106; 239/132; 239/586; 222/571; 251/331; 251/63.5; 251/11; 137/340

[58] Field of Search .................................... 239/104, 106, 239/119, 583, 586, 132, 132.1, 132.3; 222/571; 251/63.5, 11, 30.02, 129.15, 331; 137/340

[56] References Cited

U.S. PATENT DOCUMENTS

| | | | |
|---|---|---|---|
| 3,895,748 | 7/1975 | Klingenberg | 222/571 |
| 4,176,822 | 12/1979 | Chadwick | 137/340 X |
| 4,394,945 | 7/1983 | Taylor et al. | 222/571 |
| 4,597,719 | 7/1986 | Tano | 222/571 X |
| 5,134,962 | 8/1992 | Amada et al. | 222/571 X |
| 5,253,671 | 10/1993 | Kolenc | 251/63.5 X |
| 5,386,849 | 2/1995 | Gilchrist et al. | 251/331 X |
| 5,423,482 | 6/1995 | Mueller et al. | 239/119 X |
| 5,755,428 | 5/1998 | Ollivier | 251/63.5 X |

FOREIGN PATENT DOCUMENTS

8-10399   3/1996   Japan .

*Primary Examiner*—Andres Kashnikow
*Assistant Examiner*—Steve J. Ganey
*Attorney, Agent, or Firm*—Oblon, Spivak, McClelland, Maier & Neustadt, P.C.

[57] ABSTRACT

A suck back valve comprises a linear actuator which displaces a second diaphragm through a stem, an encoder which detects a displacement amount of the linear actuator, and a flow amount controller for controlling a pilot pressure supplied to an ON/OFF valve mechanism.

13 Claims, 5 Drawing Sheets

SUCK BACK VALVE WITH LINEAR ACTUATOR AND ENCODER ARRANGEMENT

BACKGROUND OF THE INVENTION

1. Field of the Invention

The present invention relates to a suck back valve capable of preventing liquid drip of a fluid from occurring at a supply port, by sucking a prescribed amount of fluid flowing through a fluid passage based on a displacement operation of a diaphragm.

2. Description of the Related Art

There has hitherto been known, for example, a semiconductor wafer manufacturing process in which a suck back valve is employed. In the suck back valve, when supply of a coating liquid to the semiconductor wafer is halted, there is a function for preventing so called liquid drip, wherein minute amounts of coating liquid drip from a supply port onto the semiconductor wafer.

Figure 5:
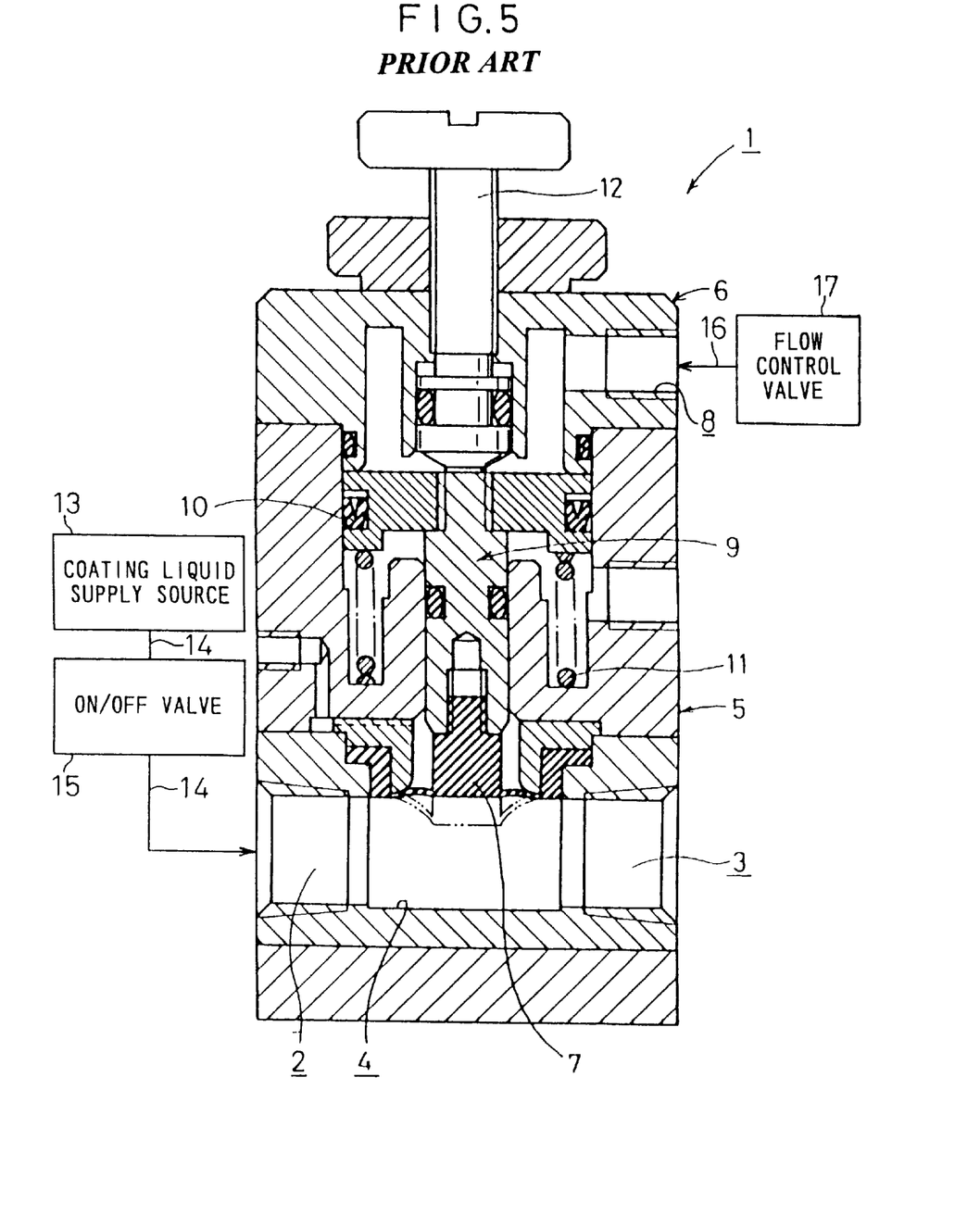
FIG. 5 Is a view explaining the operation of the suck back valve shown in FIG. 1.

The suck back valve according to such a conventional technique is shown in FIG. 5 and is disclosed, for example, by Japanese Utility Model Publication No. 8-10399.

Such a suck back valve 1 comprises a main valve body 5 formed with a fluid passage 4 interconnecting a fluid inlet port 2 and a fluid outlet port 3, and includes a bonnet 6 connected to an upper portion of the main valve body 5. A diaphragm 7 made up of a thick-walled portion and a thinwalled portion is disposed in the center of the fluid passage 4. An unillustrated pressurized fluid supply source is connected to the bonnet 6, the bonnet further being formed with a pressurized fluid supply port 8 for supplying pressurized air for operating a diaphragm under a switchover action of a directional control valve (not shown).

A piston 9 is fitted to the diaphragm 7, with a v-packing 10 installed in the piston 9 and slidable along an inner wall surface of the main valve body 5 and serving a sealing function. Further, a spring 11 which normally presses the piston in a upward direction, is disposed in the main valve body 5.

An adjusting screw 12 is disposed on the top of the bonnet 6, which, by increasing or decreasing a screw-in amount thereof, abuts against the piston 9 and adjusts a displacement amount of the piston 9, whereby the amount of coating liquid sucked by the diaphragm 7 is adjusted.

A coating liquid supply source 13 storing therein a coating liquid is connected to the fluid inlet port 2 through a pipe 14. Further, between the coating liquid supply source 13 and the fluid inlet port 2, and ON/OFF valve 15, which is constructed as a separate body apart from suck back valve 1, is connected. The ON/OFF valve undertakes a function for switching between a supply condition and a supply-halted condition of the coating liquid to the suck back valve 1, based on energizing and deenergizing actions of the ON/OFF valve 15.

Operation of the suck back valve 1 shall now be explained in outline. In an ordinary state in which the fluid is supplied from the fluid-inlet port 2 to the fluid-outlet port 3, the piston 9 and diaphragm 7 are displaced downwardly in an integrated manner in accordance with action of the pressurized fluid supplied from the pressurized fluid supply port 8. The diaphragm 7, which is coupled to the piston 9, protrudes into the fluid passage 4 as shown in FIG. 5 by the two-dot-chain line.

When flow of fluid through the fluid passage 4 is halted, the piston 9 and diaphragm 7 are raised in unison under the action of an elastic force exerted by the spring 11, by stopping the supply of pressurized fluid from the pressurized fluid supply port 8. A predetermined amount of fluid remaining in the fluid passage 4 is sucked under action of a negative pressure produced by the diaphragm 7. Thus, dripping of liquid, which would otherwise be caused at an unillustrated fluid supply port, is prevented.

In this instance, the suck back amount of the coating liquid corresponds with displacement of the piston 9, wherein a displacement amount of the piston 9 is adjusted by the screw element 12.

Incidentally, with the suck back valve 1 in accordance with the conventional technique, for adjusting the flow amount of pressurized air supplied by the pressurized fluid supply port 8, a speed controller or similar flow control valve 17 is connected thereto through a conduit 16 such as a tube. The flow amount control valve 17 adjusts the flow of pressurized fluid flowing therein by changing the flow passage area inside of the valve.

However, in the suck back valve 1 according to the conventional technique, the flow amount of pressurized air supplied by the pressurized fluid supply port 8 is controlled via a mechanical means, such as the above-described flow amount control valve 17, and therefore, there is a disadvantage that fine control of the flow amount of pressurized air supplied by the pressurized fluid supply port cannot be achieved.

Further, in the suck back valve according to the conventional technique, since adjustment of a suck back amount of the coating liquid is performed manually by increasing/decreasing a screw-in amount of a screw member 12, there results the disadvantage that the coating liquid suck back amount cannot be precisely controlled. In this case, a screw-in amount of the screw element which has been formerly set has to be reset each time corresponding to a desired coating liquid suck back amount, adding further complexity to the system.

Furthermore, when using the conventional suck back valve 1, piping connection operations become necessary between the suck back valve 1 and the flow amount control valve 17, as well as between the suck back valve 1 and the ON/OFF valve 15, resulting in further inconvenience. In addition, dedicated space becomes necessary for attachment of the flow amount control valve 17 and the ON/OFF valve 15, respectively, externally apart from the suck back valve 1, with the disadvantage that the installation space has to be increased overall.

Still further, flow passage resistance is increased as a result of additional piping connected between the suck back valve 1 and the flow amount control valve 17, with the disadvantage that response accuracy (responsiveness) of the diaphragm 7 is deteriorated.

Still further, a driving apparatus for switching the ON/OFF valve 15 between ON and OFF states must be separately provided, so that along with further piping connection operations for interconnecting the ON/OFF valve 15 and the driving apparatus, there is the disadvantage of soaring costs for the apparatus overall.

Further, in the case that the diaphragm is displaced using an unillustrated electrical means, there is the fear of changes occurring in the characteristics of the fluid flowing inside the fluid passage under action of a heat amount generated by the electrical means.

SUMMARY OF THE INVENTION

A general object of the invention is to provide highly accurate control of a pilot pressure used to displace a flexible material (diaphragm) installed in facing relation to a fluid passage, as well as provide a suck back valve which can control with high precision the flow amount fluid sucked by the flexible material.

A main object of the invention is to provide a suck back valve in which, also in cases where the flexible member (diaphragm) is displaced by an electrical means, the suck back valve is capable of preventing changes or deterioration in quality of a fluid flowing in a fluid passage due to a heat amount generated by the electrical means.

Another aim of the invention is to provide a suck back valve in which the responsiveness and accuracy of the above-mentioned flexible material (diaphragm) is improved.

Another aim of the invention is to provide a suck back valve in which piping connection operations are unnecessary, and thereby reduce the installation space of the overall apparatus.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENTS

Figure 1:
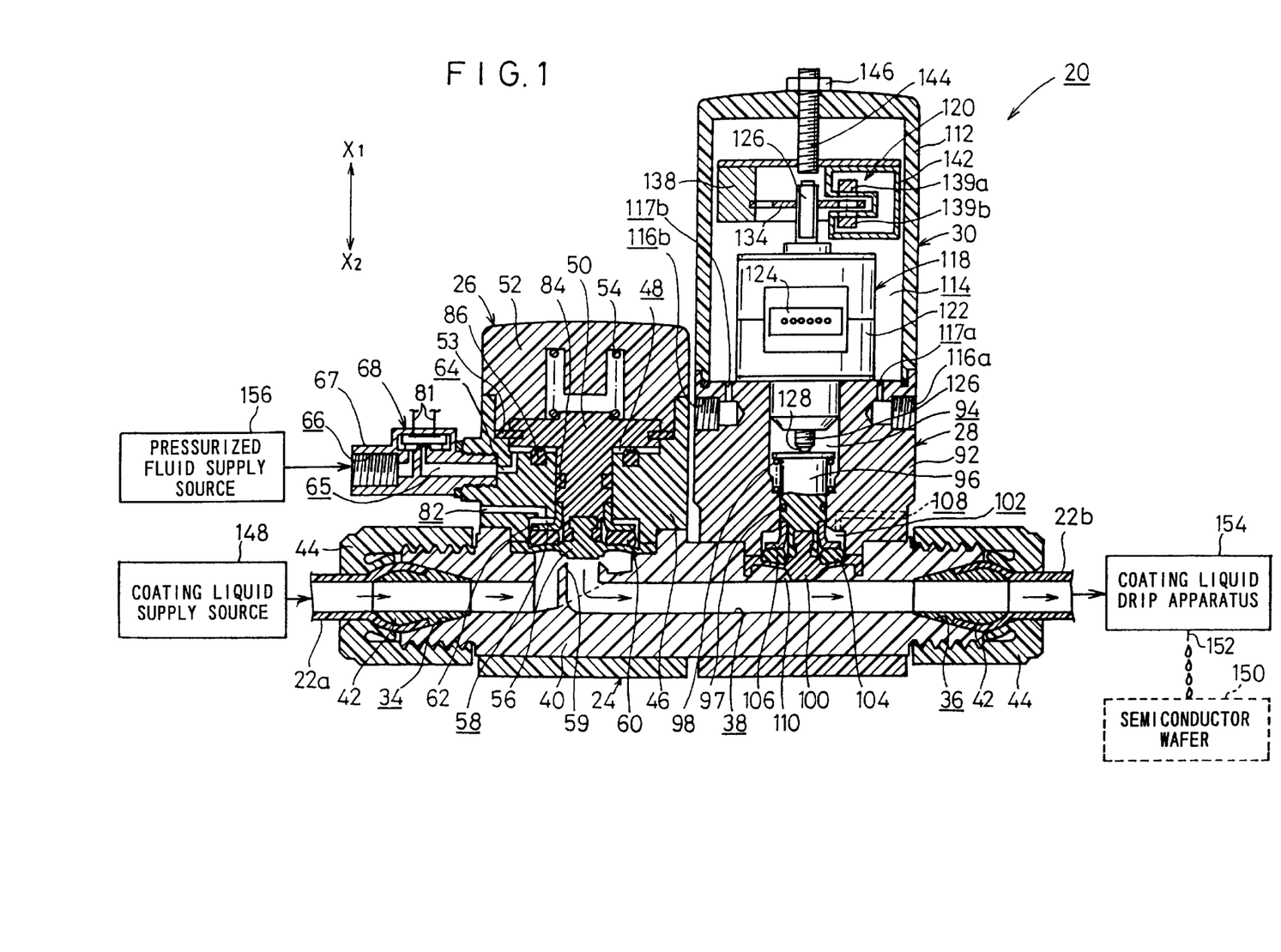
FIG. 1 is a perspective view of the suck back valve according to an embodiment of the present invention.

In FIG. 1, reference numeral 20 indicates the suck back valve in accordance with an embodiment of the present invention. The suck back valve 20 is made up of a coupling 24 having a pair of tubes 22a, 22b detachably connected thereon at a fixed interval separation, an ON/OFF valve mechanism 26 disposed on an upper part along the longitudinal direction of the coupling 24, a suck back valve mechanism 28 disposed on another upper part along the longitudinal direction of the coupling 24, and a driver 30 for driving the suck back mechanism 28. The coupling 24, ON/OFF valve 26, suck back mechanism 28 and the driver 30, as shown in FIG. 1, are assembled together integrally.

A first port 34 is formed at one end, and a second port 36 is formed at the other end of the coupling 24, the first port 34 and the second port 36 respectively engaging with a coupling body 40 having a fluid passage 38 therein intercommunicating the first and second ports 34 and 36, and further comprising inner elements 42 which are inserted into openings of tubes 22a, 22b, and lock nuts 44 which airtightly maintain the connecting positions of the tubes 22a, 22b by threaded engagement thereof onto screw threads cut into the ends of the coupling body 40.

The ON/OFF valve mechanism 24 is arranged on an upper part of the coupling 24 in proximity to the first port 34, the ON/OFF valve mechanism 24 having a first valve body 46 integrally connected with the coupling body 40, a piston 50 displaceable in a cylinder chamber 48 formed inside the first valve body 46 along directions of arrows $X_1$ and $X_2$, and a cover member 52 which hermetically seals the cylinder chamber 48. Further, between a radially expanded outer peripheral portion of the piston 50 and the first valve body 46, a flexible ring-shaped support member 53 which supports the piston 50 is disposed. In this case, the piston 50 is disposed for displacement in the direction of arrow $X_2$ by deformation of the support member 53.

A spring member 54 is disposed between the piston 50 and the cover member 52, whereby the piston 50 normally is biased downward (in the direction of arrow $X_2$) by an elastic force of the spring member 54.

A first diaphragm chamber 58 is formed at a lower end of the piston 50, wherein the first diaphragm 56 is connected to a lower end of the piston 50 and disposed so as to be displaced integrally with the piston 50. In this case, the first diaphragm 56 serves a function for opening and closing the fluid passage 38, by separation from and seating onto a seat 59 which is formed in the valve body 40. Accordingly, switching between a supply condition and a supply-interrupted condition of the fluid (i.e. coating liquid) which flows through the fluid passage 38 can be performed by opening and closing actions of the first diaphragm 56 making up the ON/OFF valve 26.

Further, a ring-shaped cushioning member 60 supporting a thin-walled portion of the diaphragm 56 is disposed on an upper surface of the first diaphragm 56, the cushioning member 60 being supported by a cross-sectionally L-shaped support member 62 connected to a lower end of the piston 50.

A flow amount control device 68, for controlling a flow amount of pressurized fluid supplied to the cylinder chamber 48, is attached to the ON/OFF valve mechanism, through a pipe 67 formed with a passage 65 therein communicating with the pilot passage 64, and a pressurized fluid supply port 66 which communicates with the passage 65.

Figure 2:
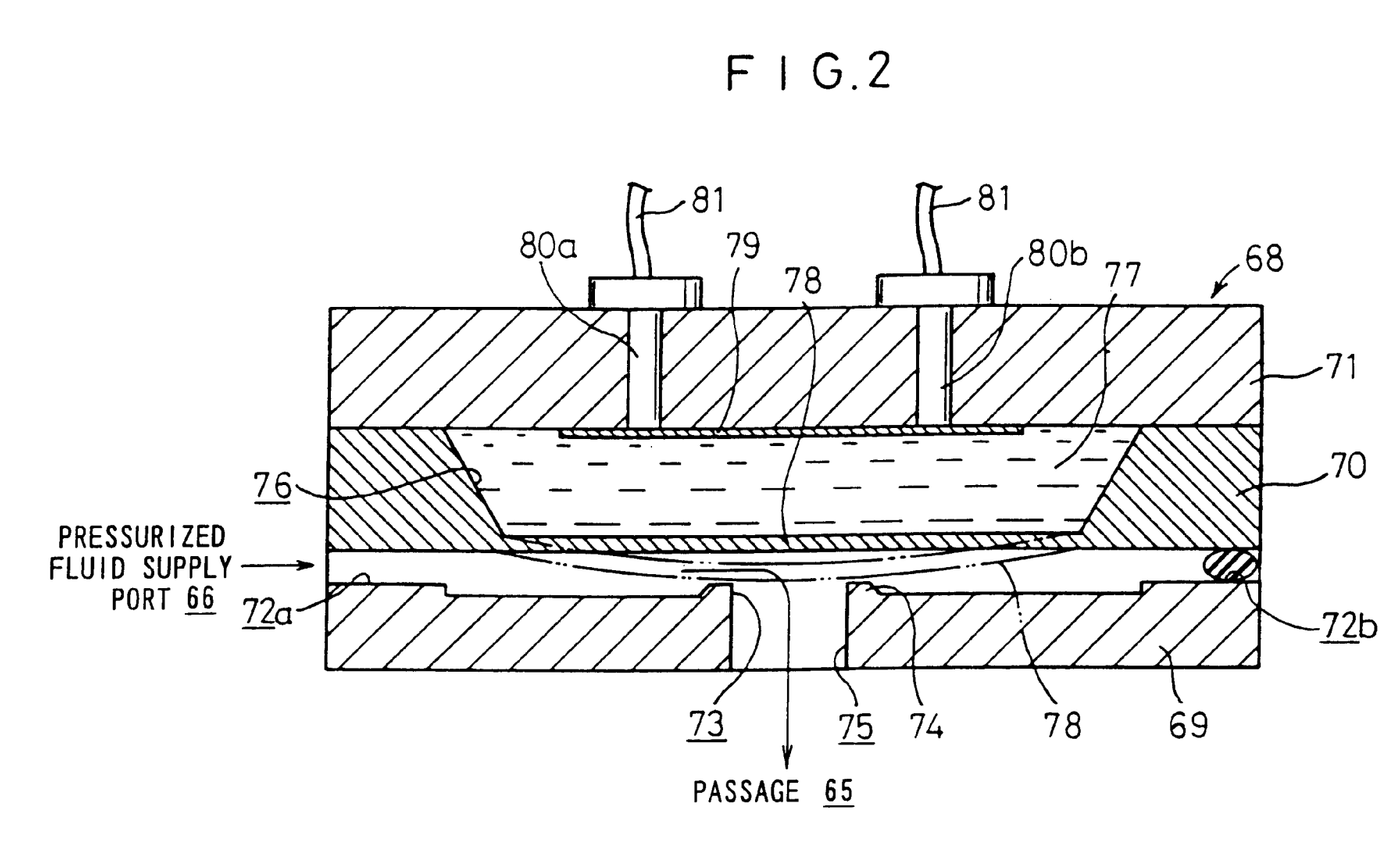
FIG. 2 is a vertical cross-sectional view of a flow amount control device making up part of the suck back valve shown in FIG. 1.

The flow amount control device 68, as shown in FIG. 2, is formed by integrally stacking a first wafer 69 formed for example from Pyrex glass, a second wafer 70 affixed to an upper surface of the first wafer 69 and made for example from a silicon substrate, and a third wafer 71 affixed to an upper surface of the second wafer 70 and formed for example from Pyrex glass.

A pair of inlet ports 72a, 72b are formed between the first wafer 69 and the second wafer 70 at a predetermined separation. In this case, one of the inlet ports 72a is disposed for communication with the pressurized fluid supply port 66, and the other inlet 72 is blocked by a blind plug.

A nozzle 74 formed with a nozzle hole 73 therein is disposed between the pair of inlet ports 72a, 72b, the nozzle hole 73 being formed to communicate with an outlet port 75 opening to the bottom of the first wafer. In addition, the outlet port 75 is disposed for communication with the passage 65.

A cross-sectionally trapezoidal-shaped chamber 76 is formed inside the second wafer 70, and a fluid 77 which expands in response to applied heating, such as a silicon liquid, is enclosed inside the chamber 76. The bottom of the chamber 76 is formed with a membrane 78, the membrane 78 being separated from an end of the nozzle 74 by a fixed distance, and formed so as to flex toward the nozzle 74 by expansion of the fluid 77 (see two-dot-chain lines in FIG. 2).

A patterned electrical resistance body 79 is disposed on the underside of the third wafer 71 making up the upper surface of the chamber 76, wherein the electrical resistance body 79 is connected to an unillustrated controller through a pair of electrodes 80a, 80b and lead lines 81.

A pilot passage 64 is formed in the first valve body 46 communicating with the cylinder chamber 48. In this case, by supplying a pressurized fluid (pilot pressure) to the cylinder chamber 48 through the pilot passage 64 under a control action of the flow amount controller 68, the piston 50 is raised in opposition to an elastic force of the spring member 54. Accordingly, the fluid passage 38 is opened by separation of the first diaphragm 56 from the seat 59 at a prescribed interval separation, wherein coating liquid flows from the first port 34 to the second port 36.

Further, a passage 82 is formed in the first valve body 46 communicating the first diaphragm chamber 58 to atmosphere, wherein by exhausting air from inside the diaphragm chamber 58 through the passage 82, the diaphragm 56 can be smoothly operated. Reference numeral 84 shows a seal element for maintaining airtightness of the cylinder chamber 48, and reference numeral 86 shows a cushioning member abutting with the piston 50 and serving a cushioning function.

A suck back mechanism 28 is disposed on an upper part of the coupling 24 in the vicinity of the second port 36, the suck back mechanism 28 having a second valve body 29 integrally connected with the coupling body 40, and a stem 96 displaceable in the directions of arrows $X_1$ and $X_2$ along a chamber 94 formed in the second valve body 92.

A wear ring 97 is attached to an outer periphery of the stem 96 through an annular groove, the wear ring 97 serving as a guide ensuring linear displacement of the stem 96. Inside the chamber 94, a spring member 98 is disposed which normally biases the stem 96 in an upward (arrow $X_1$) direction, by engagement with a flange of the stem 96, and by the elastic force of the spring member 98.

A plurality of grip prongs are formed on a lower end of the stem 96, whereby the second diaphragm 100 is supported by the plural prongs. The second diaphragm 100 is connected to the stem 96 and disposed for displacement integrally with the stem 96, wherein a second diaphragm chamber 102 is formed by the second diaphragm 100.

A ring-shaped cushioning member 104 for protecting the thin-walled portion of the second diaphragm 100 is disposed on an upper surface of the second diaphragm 100, the cushioning member 104 being support by a cross-sectionally L-shaped support member 106 connected to a lower end of the stem 96. A passage 108 for communicating the second diaphragm chamber 102 to atmosphere is formed in the second valve body 92.

Figure 4:
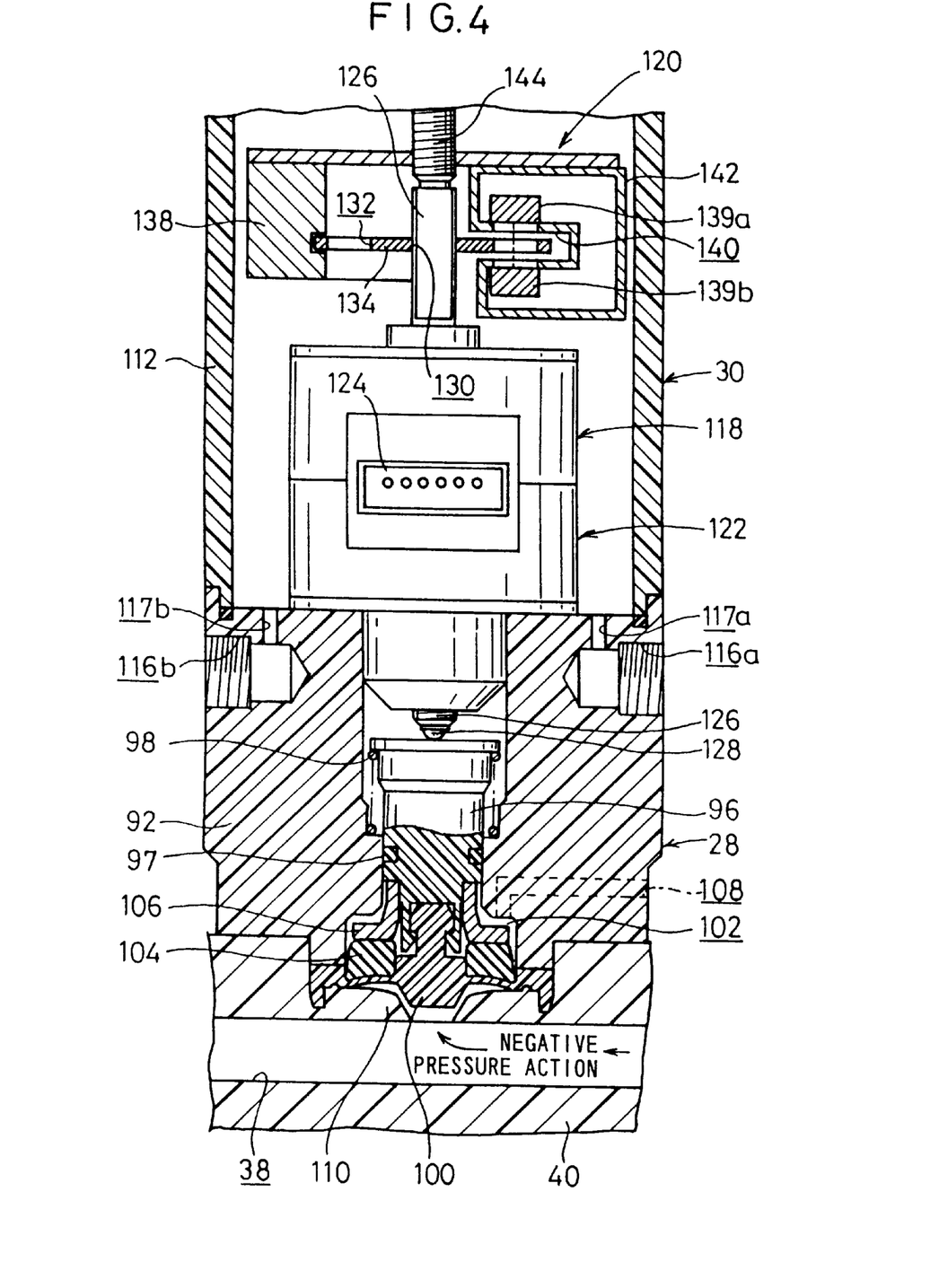
FIG. 4 is a view explaining the operation of the suck back valve shown in FIG. 1.

As shown in FIG. 4, a projection 110, having a slanted surface which follows the form of the bottom surface of the second diaphragm 100, is formed in the coupling body 40 facing the fluid passage 38. The second diaphragm 100 is disposed so as to be seated and separated with respect to the projection 110. In this case, fluid is sucked into a gap formed by separation of the second diaphragm 100 from the projection 110.

Further, a supply port 116a for supplying a non-reactive gas, for example nitrogen, to a space 114 inside the bonnet 112, and an exhaust port for discharging the non-reactant gas from inside the space 114, are formed in the second valve body 92. The supply port 116a and the discharge port 116b are formed to connect to the space 114 through respective passages 117a, 117b. In this case, the non-reactant gas functions as a coolant medium for a linear actuator to be described hereinafter.

The driver 30 includes a bonnet 112 integrally connected to an upper part of the second valve body 92. A linear actuator 118 for displacing the second diaphragm 100 through a stem 96 in directions of arrows $X_1$ and $X_2$, and an encoder 120 for detecting a displacement amount of the second diaphragm 100 based on a displacement amount of the linear actuator 118, are arranged in the space 114 inside the bonnet 112.

The linear actuator 118 is formed substantially by a four-phase uni-polar stepping motor which is energized and deenergized by electrical signals, and includes an unillustrated stator and rotor disposed in a casing, and a connector which is connected to the electric source, for supplying a magnetizing current to the stator. In this case, by rotation of the unillustrated rotor in a fixed direction, the drive axis 126 is disposed for displacement in directions of arrows $X_1$ and $X_2$.

Figure 3:
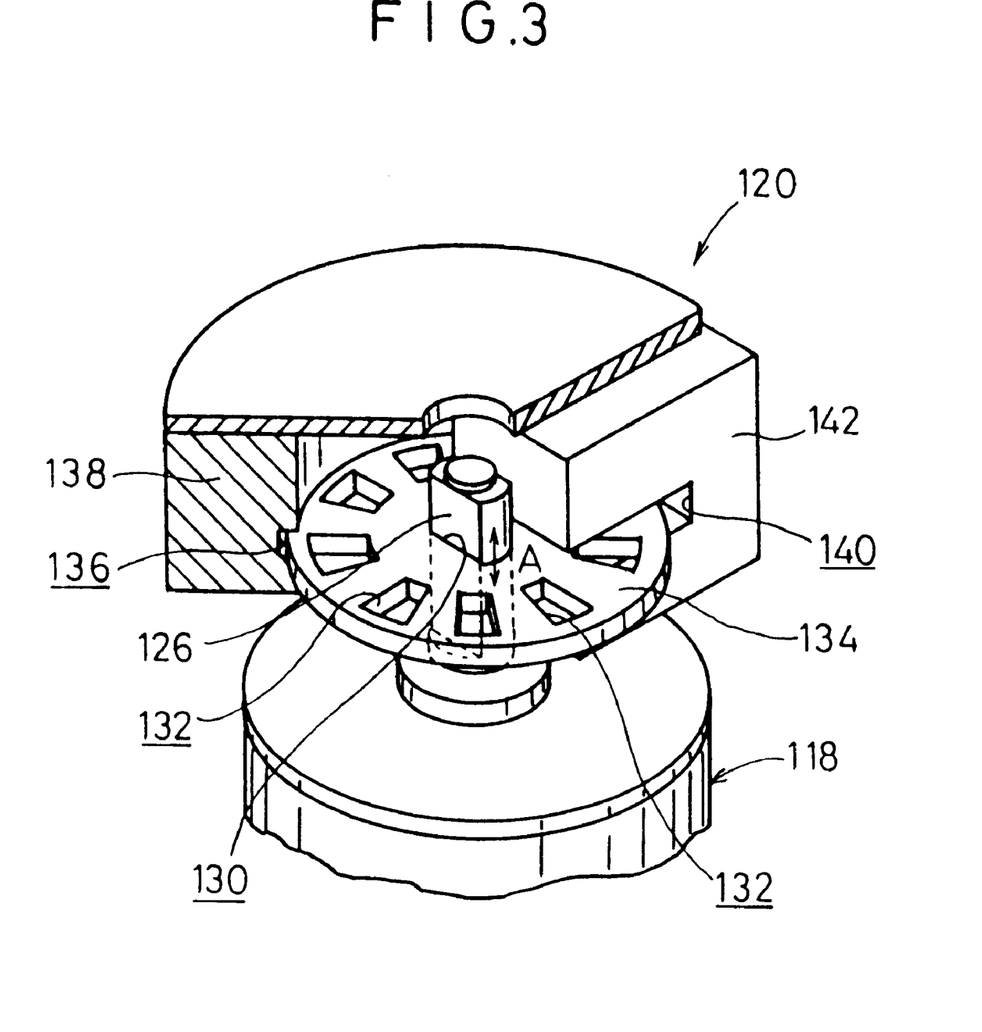
FIG. 3 is a partial cut-away perspective view of an encoder making up part of the suck back valve shown in FIG. 1.

An upper side of the drive axis 126 which is connected to the encoder 120 is formed with a cross-sectional non-circular shape, for example, an ellipse (see FIG. 3). On the other hand, a ball 128 is fitted into a lower end of the drive axis 126 via a hole. The ball 128 is formed so as to make point contact with an upper surface of the stem 96.

In this case, as shown in FIG. 4, the stem 96 and the drive axis 126 of the linear actuator 118 are not integrally connected through a coupling member or the like, but rather are constructed such that the stem 92 and the drive axis 126 abut through the ball 128. Accordingly, in the case that the stem 96 and the drive axis 126 of the linear actuator 118 are not coaxial due to a connecting error, or stated otherwise, even in a condition that the drive axis 126 of the linear actuator 118 abuts at a slightly inclined angle with respect to the axial line of the stem 96, they are disposed so as to permit tolerance of such an error.

An encoder 120, as shown in FIG. 3, includes a disk 134 formed in its center with a cross-sectional substantially elliptically-shaped hole 130 corresponding to an upper end of the drive axis 126, and a plurality of slits 132 disposed along a periphery thereof at fixed interval spacings.

Further, the encoder 120, as shown in FIGS. 3 and 4, includes a support member 138 with an annular groove 136 formed on an inner circumferential surface thereof for rotation therein of the disk 134, and formed in a circular shape with approximately one fourth thereof cut away, and also includes a photo-interrupter 142 having a light emitting element 139a and a light receiving element 139b disposed at a predetermined interval separation, and arranged so as to face a part of the disk 134 inside of a recess 140 which formed in a cross-sectional ⊐-shape. A displacement amount of the linear actuator 118 is detected by receipt, by the light receiving element 139b, of light generated by the light emitting element 139a which penetrates the slits 132 of the disk 134.

In this case, the drive axis 126 on the upper side of the linear actuator 118 is disposed for displacement along the directions of arrow A (see FIG. 3), with respect to the elliptically cross-sectioned hole 130 formed in the disk 134. Accordingly, the drive axis 126 of the linear actuator 118 is disposed for displacement in upward and downward directions, through the cross-sectionally elliptically-shaped hole 130, with respect to the disk 134 which is limited in displacement in upward and downward directions (directions of arrow A).

More specifically, the disk 134 is rotatably disposed in a fixed direction with the drive axis 126 as a center of rotation, and further its displacement in upward and downward directions is restricted by the annular groove 136 in the support member 138. As a result, by fixedly maintaining the height of the disk 134, a clearance between the light emitting element 139a and the light receiving element 139b which are disposed in the recess 140 of the photo-interrupter 142 and the disk 134 is assured.

A stopper 144 which abuts with one end of the drive axis 126, and a nut 146 which engages the stopper 144 at a fixed position, are disposed on an upper surface of the bonnet 112. The stopper 144 is threaded into a screw hole of the bonnet 112 by threads cut into the outer circumferential surface thereof, wherein by increasing/decreasing a screw-in amount thereof, the drive axis 126 is engaged and stopped at a fixed position along the upward/downward direction.

The suck back valve 20 in accordance with the present embodiment is constructed basically as described above. Next an explanation shall be given of the operation and effects thereof.

First, the coating liquid supply source 148, storing therein a coating liquid, is connected to the tube 22a communicating with the first port 34 of the suck back valve 20, whereas the coating liquid drip apparatus 154, having disposed therein a nozzle 152 by which coating liquid is dripped onto a semiconductor wafer 150, is connected to the tube 22b communicating with the second port 36. Further, by adjusting a screw-in amount of the stopper 144, the initial position of the drive axis 126 of the linear actuator 118 is set.

Further, an activation signal is issued to the linear actuator 118 from an unillustrated controller through the connector 124, and as shown in FIG. 1, the drive axis 126 of the linear actuator is set in its lowermost position.

After completion of these preparatory measures, the pressurized fluid supply source 156 is energized, outputting pressurized fluid to the pressurized fluid supply port 66. The pressurized fluid (pilot pressure) which is introduced to the pressurized fluid supply port 66 is in turn introduced to the flow amount control device 68.

Then, the controller (not shown) issues an activation signal to the flow amount control device 68. In the flow amount control device 68, a current flows to the electrical resistance body 79 through the electrodes 80a, 80b, causing heating of the electrical resistance body 79.

As a result, the fluid 77 which is filled inside the chamber 76 is heated and expands, and as shown by the two-dot-chain lines in FIG. 2, the membrane 78 is pressed upon and flexes downward, whereby the separation interval between the membrane 78 and the nozzle 74 is set at a predetermined amount. Accordingly, the flow amount of pressurized fluid which flows toward the outlet port 75 from the nozzle hole 73 is controlled by constriction thereof according to the separation interval between the membrane 78 and the nozzle 74.

The result is that, by adjusting the flow amount of pressurized fluid which is exhausted from the outlet port 75 of the flow amount control device 68, pilot pressure supplied to the cylinder chamber 48 of the ON/OFF valve mechanism 26 is controlled to a predetermined value.

The pressurized fluid (pilot pressure) introduced to the cylinder chamber 48 displaces the piston 50 in the direction of arrow $X_1$ in opposition to the elastic force of the spring member 54. Accordingly, the first diaphragm 56 connected to the piston 50 separates from the seat 59 and the ON/OFF valve mechanism 26 assumes an ON state. At that time, coating liquid which is supplied from the coating liquid supply source 148 flows along the fluid passage 38, and coating liquid is dripped onto the semiconductor wafer 150 through the coating liquid drip apparatus 152. As a result, a layer of coating liquid (not shown) having a desired film thickness is formed on the semiconductor wafer 150.

After a predetermined amount of coating liquid is coated on the semiconductor wafer 150 via the coating liquid drip apparatus 152, supply of pressurized fluid to the ON/OFF valve mechanism is halted. Accordingly, the piston 50 is displaced in the direction of arrow $X_2$ under action of the elastic force of the spring member 54, whereby the first diaphragm 56 is seated onto the seat 59, and the ON/OFF valve mechanism 26 assumes an OFF state.

Supply of coating liquid to the semiconductor wafer 150 is halted, by interruption of the fluid passage 38, when the ON/OFF valve mechanism 26 assumes an OFF state, and the dripping state of coating liquid toward the semiconductor wafer 150 from the nozzle 152 of the coating liquid drip apparatus 154 is also halted. In this case, because coating liquid immediately preceding that which has dripped onto the semiconductor wafer 150 remains inside the nozzle 152 of the coating liquid drip apparatus 154, there is the fear that unwanted liquid dripping can occur.

At that point, an unillustrated controller issues an activation signal to the linear actuator 118 through a connector 124, displacing the drive axis 126 of the linear actuator 118 upwardly in the direction of arrow $X_1$. Accordingly, the second diaphragm 100 and the stem 96 are raised in unison under action of the elastic force of the spring member 98, attaining the condition shown by FIG. 4.

That is, by raising the second diaphragm 100 under a displacement action of the drive axis 126 of the linear actuator 118, a negative pressure is generated. As a result of this negative pressure, a predetermined amount of coating liquid in the fluid passage 30 is sucked along the direction of the arrow in FIG. 4, into the gap formed between the second diaphragm 100 and the projection 110. As a result, a predetermined amount of coating liquid which remains in the nozzle 152 of the coating liquid supply apparatus 154 is returned in the direction of the suck back valve 20 side, and thereby unwanted liquid dripping with respect to the semiconductor wafer can be prevented.

In this case, the displacement amount of the second diaphragm 100 is detected by the encoder 120 through a rotation amount of the linear actuator 118, and based on a detection signal (pulse signal) output from the encoder 120, the controller controls the linear actuator 118 so as to stop the second diaphragm 100 at a preset position More specifically, the unillustrated controller counts the pulse signals that are output from the encoder 120, and when a preset number of pulses, which is set ahead of time, is reached, a deactivation signal is output to the linear actuator 118, whereby the drive state of the linear actuator 118 is stopped. Accordingly, because the second diaphragm 100 can be stopped at a position corresponding to a sucked-in amount of the coating liquid, the sucked amount of coating liquid can be easily and highly accurately controlled.

When the ON/OFF valve mechanism 26 again assumes an ON state, and the first diaphragm 56 is separated from the seat 59, together with seating of the second diaphragm on the projection 100 under a driving action of the linear actuator 118, the condition shown in FIG. 1 is reached, and dripping of coating liquid onto the semiconductor wafer 150 is reinitiated.

In the present embodiment, the flow amount of coating liquid sucked by the second diaphragm 100 can be electrically controlled through the linear actuator 118. Accordingly, the flow amount of coating liquid sucked by the second diaphragm can be easily and highly accurately controlled.

In this case, because the linear actuator 118 can be suitably cooled by a non-reactant gas which is filled in the space 114, the nature of the fluid (for example, the coating liquid) flowing in the fluid passage 38 is not deteriorated or changed due to a heat amount generated by the linear encoder 118, and the fluid can be maintained at a fixed quality.

Further, as compared with the conventional technique in which a mechanical means is used for controlling flow amount of a pressurized fluid, in the present embodiment, by means of an electrically controlled flow amount control device 68, pilot pressure supplied to the ON/OFF valve mechanism 26 can be highly accurately controlled, and the response accuracy of the ON/OFF valve mechanism can be even further improved.

More specifically, by controlling the pilot pressure supplied to the ON/OFF valve mechanism 26 by the flow amount control device 68, as compared to the conventional technique, the driving speed of the ON/OFF valve mechanism is improved, together with expanding the operational range thereof. Further, by raising the speed at which the ON/OFF valve mechanism 26 is switched between ON and OFF states, it becomes possible to accurately set the flow amount of coating liquid which is dripped onto the semiconductor wafer 150. Further, the membrane 78 can withstand flexure operations at high frequency, so that clipping is reduced and reproducibility of action is improved.

Further, in the present embodiment, by integrally assembling, respectively, the coupling 24, the ON/OFF valve mechanism 26, the suck back mechanism 28 and the driver 30, unlike the conventional technique, pipe connection operations between the suck back valve 20 and a flow amount control valve, or between the suck back valve 20 and a separate ON/OFF valve mechanism, are unnecessary. Because there is no need to provide a dedicated space for separate attachment of a flow amount control valve or an ON/OFF valve, effective use of installation space is enabled.

Furthermore, in the present embodiment, because the ON/OFF valve mechanism 26, the driver 30, and so on, are formed integrally with the suck back mechanism 28, as compared to having suck elements constructed separately and then connected together as in the conventional technique, the overall structure of the apparatus can be accomplished on a smaller scale.

Furthermore, in the present embodiment, because there is no need for pipes between the suck back valve 20 and a flow amount control valve, an increase in fluid passage resistance can be avoided.

What is claimed is:

1. A suck back valve comprising:
   a coupling having a fluid passage with a first port formed in one end, and a second port formed in another end thereof;
   a suck back mechanism for sucking a fluid inside of said fluid passage under a negative pressure generated by displacement of a flexible member;
   an ON/OFF valve mechanism for opening and closing said fluid passage under action of a pilot pressure;
   a driver having an electric linear actuator for displacing said flexible member;
   a flow amount controller controlling the pilot pressure applied to said ON/OFF valve mechanism; and
   a cooling medium for cooling said electric linear actuator;
   wherein said flow amount controller comprises a container in which a fluid, expandable and compressible by heat, is enclosed, and which is formed in part by a membrane, a nozzle facing the membrane of said container, and a heating device for controlling heating of the fluid in said container.

2. The suck back valve according to claim 1, wherein said cooling medium is formed by a non-reactant gas which is introduced into a space arranged in said electric linear actuator through a supply port formed in a valve body of the suck back mechanism.

3. The suck back valve according to claim 1, wherein the coupling, the suck back mechanism, the ON/OFF valve mechanism and the driver, respectively are assembled integrally.

4. A suck back valve comprising:
   a coupling having a fluid passage with a first port formed in one end, and a second port formed in another end thereof;
   a suck back mechanism for sucking a fluid inside of said fluid passage under a negative pressure generated by displacement of a flexible member;
   an ON/OFF valve mechanism for opening and closing said fluid passage under action of a pilot pressure;
   a driver having an electric linear actuator for displacing said flexible member;
   a flow amount controller controlling the pilot pressure applied to said ON/OFF valve mechanism; and
   a cooling medium for cooling said electric linear actuator;
   wherein said suck back mechanism is displaceably disposed in said valve body and comprises a stem abutting a drive axis of said electric linear actuator, a diaphragm facing the fluid passage and displaceable integrally with said stem, and a spring member biasing said stem toward said electrical linear actuator.

5. The suck back valve according to claim 4, wherein said electric linear actuator comprises a stepping motor, wherein the drive axis of the stepping motor and said stem are disposed in point contact through a ball.

6. The suck back valve according to claim 4, wherein said cooling medium is formed by a non-reactant gas which is introduced into a space arranged in said electric linear actuator through a supply port formed in a valve body of the suck back mechanism.

7. The suck back valve according to claim 4, wherein the coupling, the suck back mechanism, the ON/OFF valve mechanism and the driver, respectively are assembled integrally.

8. A suck back valve comprising:
   a coupling having a fluid passage with a first port formed in one end, and a second port formed in another end thereof;
   a suck back mechanism for sucking a fluid inside of said fluid passage under a negative pressure generated by displacement of a flexible member;
   an ON/OFF valve mechanism for opening and closing said fluid passage under action of a pilot pressure;
   a driver having an electric linear actuator for displacing said flexible member;
   a flow amount controller controlling the pilot pressure applied to said ON/OFF valve mechanism; and
   a cooling medium for cooling said electric linear actuator;
   wherein said flexible member comprises a diaphragm, and wherein the diaphragm is disposed to be seated on and separated from a projection having a slanted surface following the form of a bottom surface of said diaphragm, and said fluid is sucked under a negative pressure into a gap formed by separation of the diaphragm from said projection.

9. The suck back valve according to claim 8, wherein said cooling medium is formed by a non-reactant gas which is introduced into a space arranged in said electric linear actuator through a supply port formed in a valve body of the suck back mechanism.

10. The suck back valve according to claim 8, wherein the coupling, the suck back mechanism, the ON/OFF valve mechanism and the driver, respectively are assembled integrally.

11. A suck back valve comprising:

a coupling having a fluid passage with a first port formed in one end, and a second port formed in another end thereof;

a suck back mechanism for sucking a fluid inside of said fluid passage under a negative pressure generated by displacement of a flexible member;

an ON/OFF valve mechanism for opening and closing said fluid passage under action of a pilot pressure;

a driver having an electric linear actuator for displacing said flexible member;

a flow amount controller controlling the pilot pressure applied to said ON/OFF valve mechanism;

a cooling medium for cooling said electric linear actuator; and an encoder disposed in said driver for detecting a displacement amount of the electric linear actuator, in accordance with receipt of light by a light receiving element, the light being generated by a light emitting element and penetrating a circular disk through a slit therein;

wherein an end of the drive axis of said electric linear actuator is formed with a non-circular cross-section, said end of the drive axis being slidably disposed along an axial direction of said drive axis with respect to a hole formed in the center of said disk corresponding to the cross-sectional form of said drive axis.

12. The suck back valve according to claim 11, wherein said cooling medium is formed by a non-reactant gas which is introduced into a space arranged in said electric linear actuator through a supply port formed in a valve body of the suck back mechanism.

13. The suck back valve according to claim 11, wherein the coupling, the suck back mechanism, the ON/OFF valve mechanism and the driver, respectively are assembled integrally.

* * * * *